Oct. 30, 1928.
R. W. KROUT
1,689,879
MACHINE RELATING TO THE PRODUCTION OF CANDY
Filed Dec. 22, 1922  4 Sheets-Sheet 1
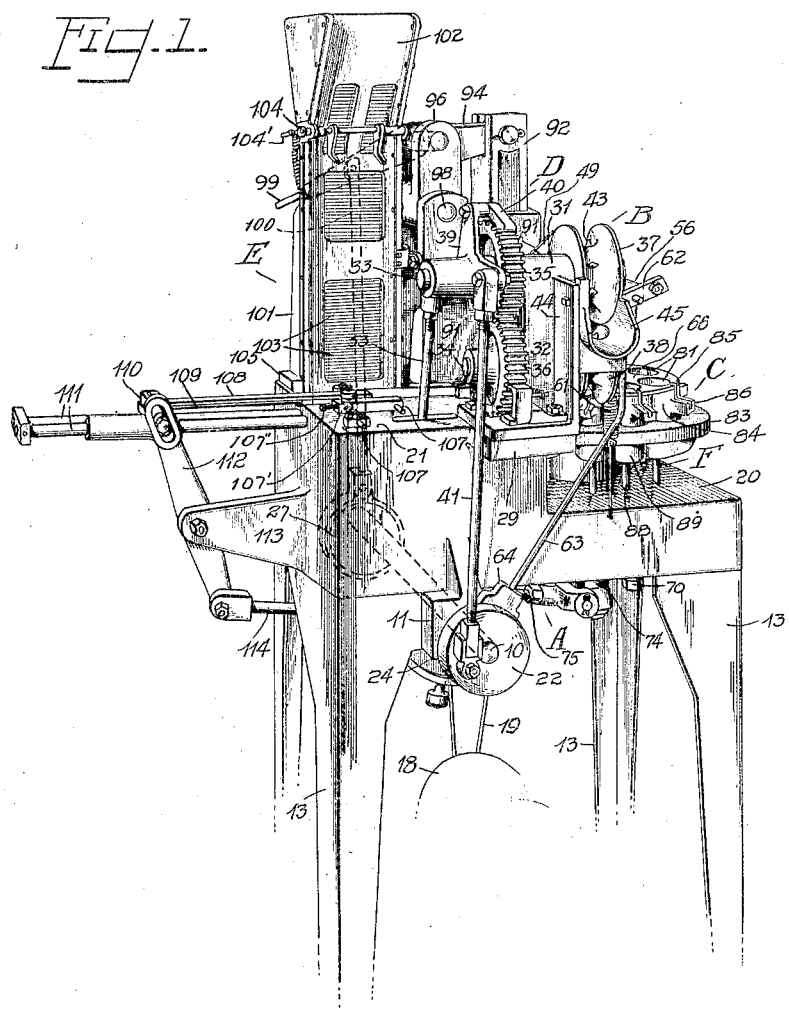
Ray W. Krout
INVENTOR
BY 
ATTORNEY.

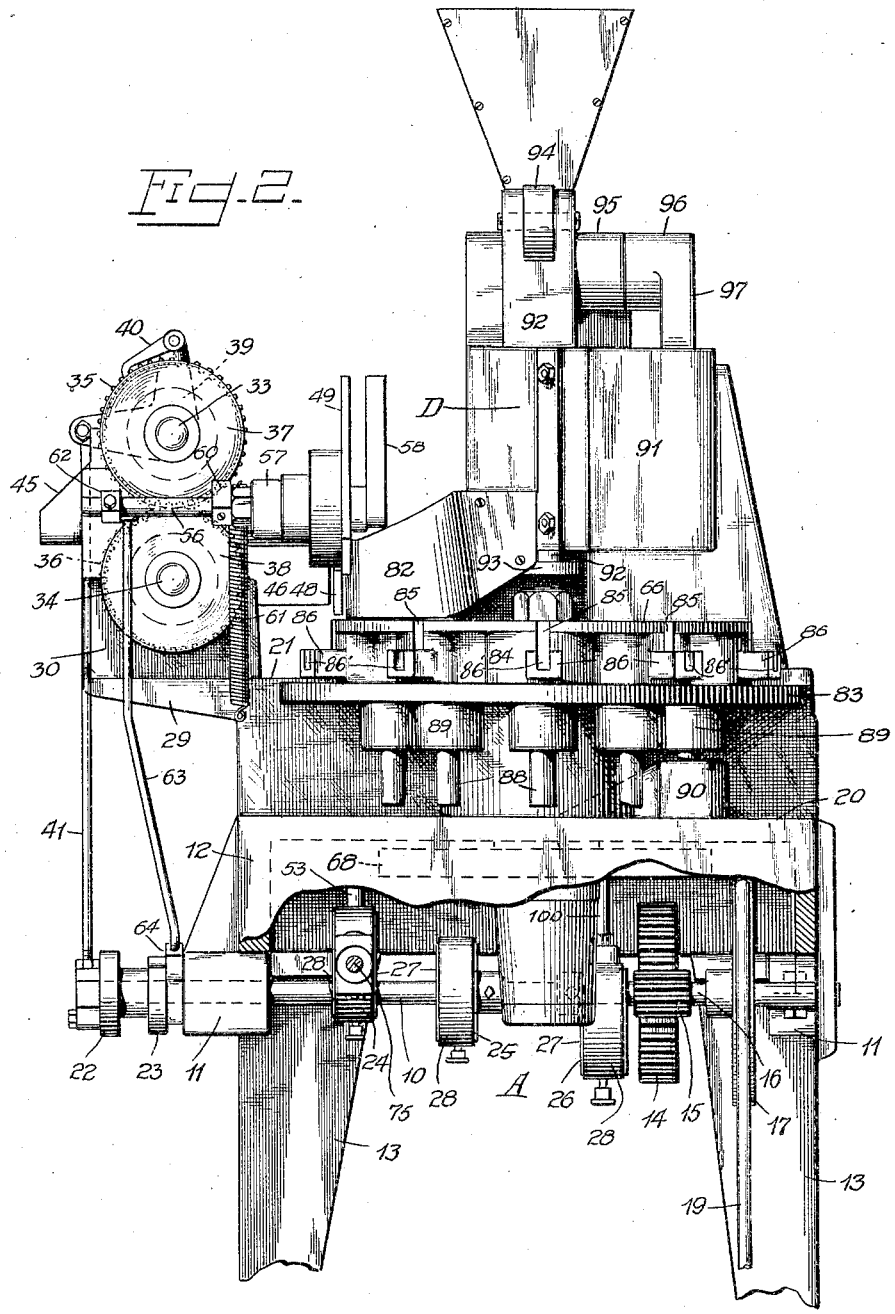

Oct. 30, 1928.

R. W. KROUT 1,689,879

MACHINE RELATING TO THE PRODUCTION OF CANDY

Filed Dec. 22, 1922

4 Sheets-Sheet 3

Ray W. Krout
INVENTOR

BY *[signature]* his ATTORNEY.

Oct. 30, 1928.
R. W. KROUT
1,689,879
MACHINE RELATING TO THE PRODUCTION OF CANDY
Filed Dec. 22, 1922    4 Sheets-Sheet 4
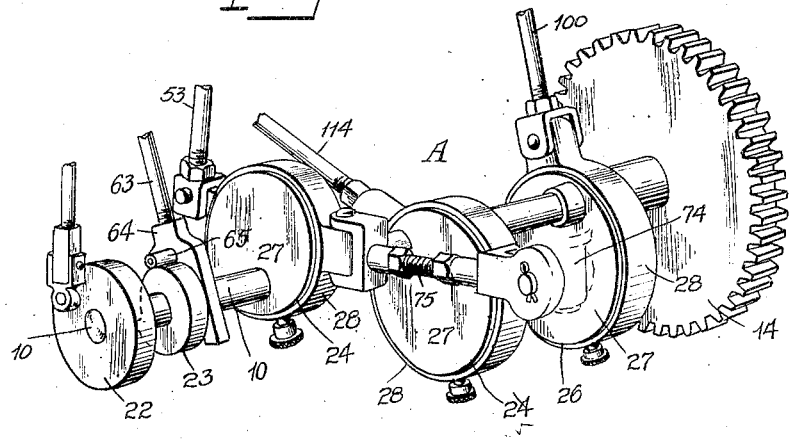
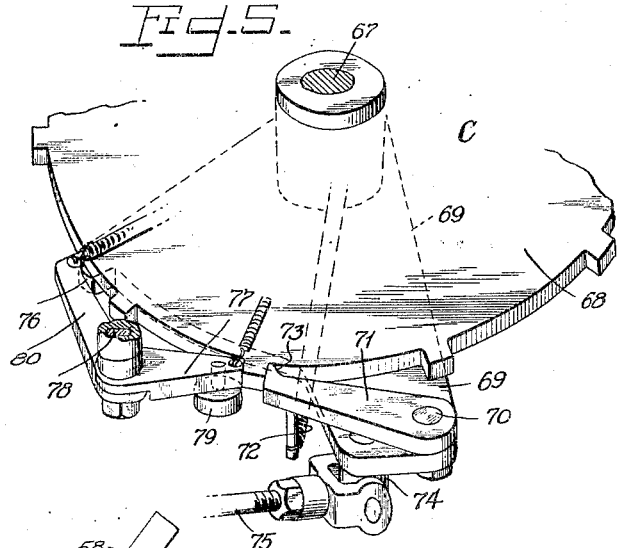
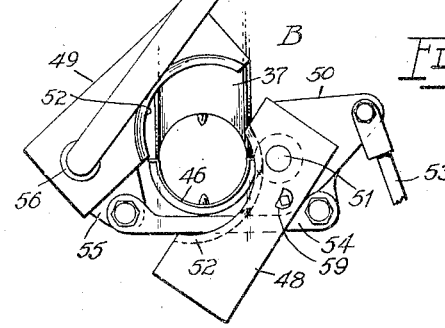
Ray W. Krout
INVENTOR
BY
his ATTORNEY Patented Oct. 30, 1928.

1,689,879

UNITED STATES PATENT OFFICE.

RAY W. KROUT, OF NEWARK, NEW JERSEY, ASSIGNOR, BY MESNE ASSIGNMENTS, TO RACINE CONFECTIONERS' MACHINERY COMPANY, OF RACINE, WISCONSIN, A CORPORATION OF WISCONSIN.

MACHINE RELATING TO THE PRODUCTION OF CANDY.

Application filed December 22, 1922. Serial No. 608,431.

This invention relates to the production of a confection known as "lollypops" or sucker candy, i. e., a formed tablet of candy material having a stick projecting from the edge thereof, and the invention pertains more particularly to apparatus for feeding, sizing, and cutting the mass of candy material into separate pieces, and finally ejecting the finished product from the machine.

The principal objects of the invention are to provide an apparatus of this character, which will operate rapidly and efficiently, and which will be of durable and relatively simple construction.

In the form of the invention which I have herein disclosed, the candy is first prepared and distributed in a plastic condition to the sizing, feeding and cutting device. The severed pieces of candy are then received in suitable die molds and advanced to a plunger which descends into each mold to form the plastic material therein into the desired shape. Simultaneously with the descent of the plunger a stick is inserted into the edge of the compressed material. The plunger then is withdrawn to complete its cycle and the die molds move to the next step and the finished candy with a stick projecting from its edge is finally ejected from the mold and conducted through a cooler in which the material is solidified and conditioned for wrapping.

Figure 3:
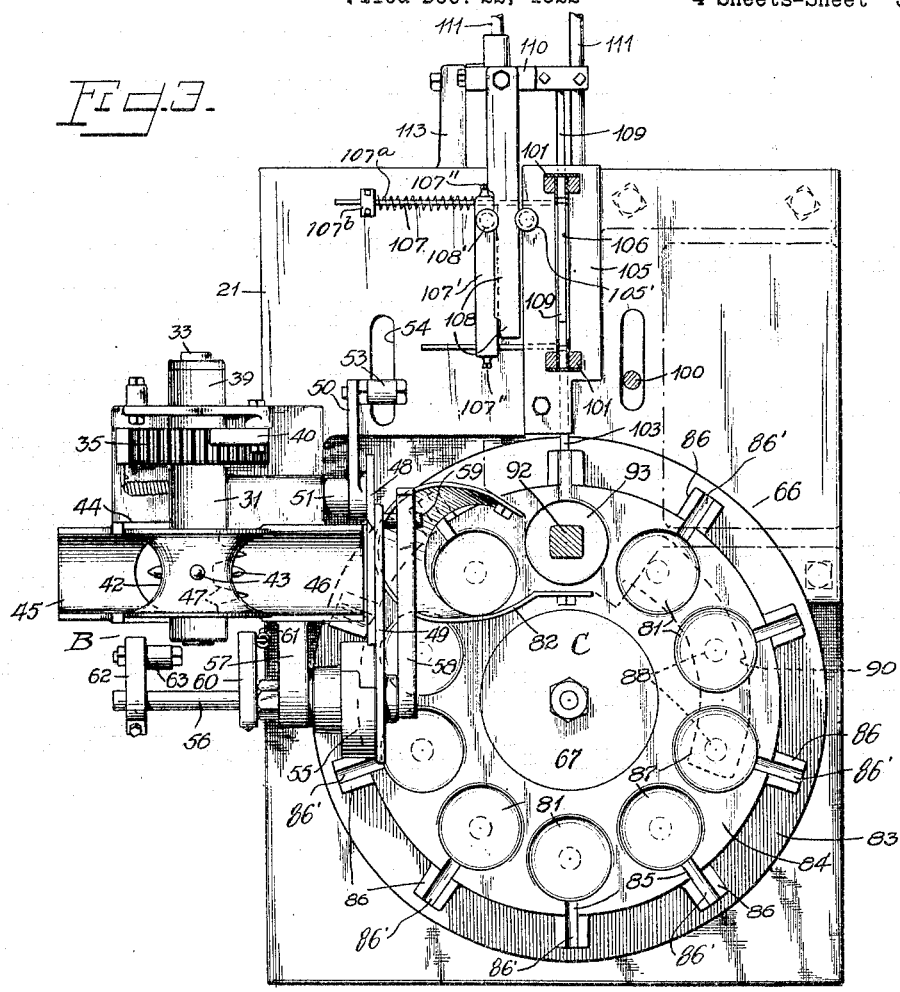
Figure 6:
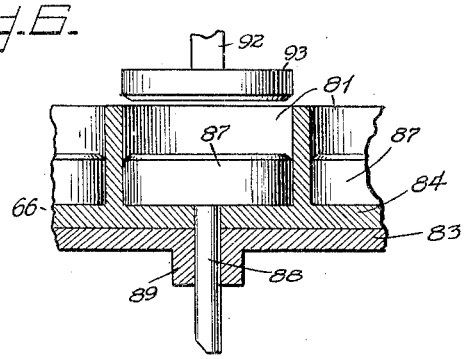

In the accompanying drawings, which disclose the preferred embodiment of my invention, Figure 1 is a perspective view of my improved apparatus for producing sucker candy; Figure 2 is a front elevational view of the invention showing the power mechanism and the shaping, feeding and cutting device; Figure 3 is a plan view of the bed of the machine, showing the plunger and stick holder in section; Figure 4 is a perspective view of the power shaft showing the several units for operating the various elements of the machine; Fig. 5 is a fragmentary perspective view of the mechanism for operating the turntable; Figure 6 is a substantially transverse sectional view taken through one of the die molds; and Figure 7 is an elevational view looking towards the delivery end of the sizing, feeding and cutting device.

Before giving a detail description of the apparatus and to permit a clearer understanding of the principles of operation to be had, a brief description of the principal elements is given, the elements themselves being denoted by reference characters referring to each element as a whole.

The plastic candy material is supplied to the apparatus in a continuous roll and is received first by the sizing, feeding and cutting device B which is actuated from a general power shaft A. Simultaneously with the operation of the device B a preferably circular series of die molding units C is set in motion and the severed pieces of candy material therein are advanced to a station where they receive an impression from a die carried by a reciprocating plunger D. A stick inserting apparatus E operated by the power shaft A is brought into operation so as to insert a stick into the piece of candy material while the latter is being subjected to the action of the plunger D. For every cycle of the plunger D the die molding units C are moved one step in their circular course until the finished product has been moved substantially beyond the plunger D, whereupon an ejecting arrangement F elevates the sucker out of the die mold.

It should be noted that while a comparatively large number of operations are provided, the operating mechanisms are of a simple type and more or less interconnected in such manner as to provide for the proper timing and the use of a minimum number of driving mechanisms.

In describing the apparatus, the description will follow, as far as possible the cycle of operations above indicated, substantially following the course employed in producing one formed confection with a stick inserted therein.

The power distributing apparatus A for imparting movement to the several elements of the invention is illustrated particularly in Figures 2 and 4, wherein 10 denotes a power shaft mounted in bearings 11 disposed at opposite sides of the machine and depending from a bed plate 12 which is supported on suitable standards 13. The shaft 10 is driven by a spur gear 14 in mesh with a pinion 15 of a shaft 16, the latter being disposed parallel to the shaft 10 and provided with a pulley 17 connected to a pulley of a motor 18 by a belt 19. The bed plate 12 is constructed to provide two steps or planes one in advance and above the other. The lower and forward step is indicated 20 and supports the molding dies C, while the upper step 21 supports the sizing, feeding and cutting apparatus B, the plunger D and the stick inserting device E. The power shaft 10 forming the main source of power of the apparatus and operating all the elements or mechanisms extends from side to side of the bed plate 12 so as to be readily accessible to each element.

The shaft 10 carries a series of eccentrics or eccentrically operated arrangements from which the several elements of the invention, indicated above, are operated. The first, 22, is a disc mounted on the shaft farthest from the spur gear 14, and is operatively connected with the sizing and feeding instrumentalities of the apparatus B. The next member is a disc cam 23 operating to drive a hammer against the severed sections of material, which have been separated from the main roll, and which tend to stick to the cutters. The third member is an eccentric 24 operating to intermittently advance the die molds C throughout their cycle and to impart a shearing movement to the cutting blades of the apparatus B. A fourth eccentric 25 operates the stick inserting device E and the last eccentric 26 controls the reciprocating movement of the plunger D. The eccentrics are practically similar in construction and comprise an inner circular disc 27 eccentrically disposed with respect to the axis of the shaft 10 and a strap 28 slidably mounted about the periphery of the disc. Each strap is connected to the part to be operated by a link connection which will be more fully described hereinafter.

The shaping, feeding and cutting apparatus, designated B, and operated by movement of the eccentrics 22, 23 and 24, is mounted on the upper step 21 upon a projecting bracket 29 forming an integral part of the bed plate casting 12. The apparatus comprises an upright supporting casting 30 having upper and lower parallel bearings 31 and 32 the axes of which project counter to that of the shaft 10, the bearings 31 and 32 being adapted to receive rotary shafts 33 and 34 respectively. The shafts 33 and 34 project outwardly from both faces of the upright 30 to receive a pair of spur gears 35 and 36 at their rear ends and a pair of sizing and feeding rollers 37 and 38 at the other or forward ends. The rearward projection of the upper shaft 33 is somewhat longer than the under shaft and carries a loosely mounted bell crank lever 39, the upright arm of which supports a pivoted dog 40 adapted to engage the teeth of the gear 35, and the other arm of which is connected to the eccentric 22 by a connecting link 41. Rotary movement of the member 22 will cause the link 41 to reciprocate in a vertical plane and the bell crank lever 39 will rock about the shaft 33 and with each forward movement of the dog 40 the gear 35 will be rotated a corresponding distance. The sizing and feeding rollers 37 and 38 on the other ends of the shafts, both comprise flanged wheels having the peripheries of the flanges held constantly in rolling engagement with each other. The section between the flanges, designated 42, is semicircular in shape, so that the space between the superposed rollers forms a substantially perfect circle. As a result, when the plastic candy substance is forced through this space the material issuing therefrom will be of a uniform cross section throughout. The material is impinged upon by radially mounted pins 43 carried about the crown of the curved channels between the flanges of the wheels, so as to force the sized material to travel towards the cutters.

Mounted on the upright support 30 and attached to a wing portion thereof is a curved trough 45, over which the unsized candy is drawn towards the rollers. The curve of this trough 45 is substantially coincident with the curve of the channel 42 and its inner end, overlying the upper segment of the wheel 38, is curved to prevent the material from sagging downwardly over the outside of the roller. A second trough 46 supported on the upright 30 and axially aligned with the first trough 45, is disposed at the opposite or delivery edge of the rollers. The inner end of this second trough is provided with saw tooth projections 47 which conform closely to the curvature of the channel 42 in the under roller 38 and are adapted to aid in separating the candy from the surfaces of the channel and also the pins 43. It will be understood that the rotary movement of the rollers 37 and 38 will take place during the downward movement of the link 41, so that during the remaining movement of the cycle the rollers will remain entirely inactive.

During this advance movement of the sized candy substance the latter has been moved to a stage where a certain length thereof projects beyond the outer end of the trough 46 and beyond the blades 48 and 49 of the cutting arrangement. As will be seen in Figure 3 the blades operate across the mouth of the trough 46 and closely adjacent the end thereof. The blade 48 comprises the under member of the pair and is carried at one end by a lever arm 50 which in turn is loosely supported on a stub shaft 51 projecting from the support 30. The blades are both provided with curved cutting edges 52. Oscillatory movement is imparted to the lever arm 50 by means of a link rod 53 pivotally connected at one end to the strap 28 of the eccentric 24 and at the other end to the free end of the arm itself. According to the present construction the blade will be moved to its uppermost position when the high segment of the eccentric 24 is in its lowermost position. The other blade 49 is similarly mounted at the opposite side of the trough 46, and is provided with an arm 55 connected with the arm 50 by a link 54. As will be seen, link 53 draws the arm 50 downwardly while the blade 48 moves upwardly across the face of the trough 46 and simultaneously with this operation the link 54 advances towards the axis of the trough and swings the other arm 55 forwardly, the blade 49 in this case moving downwardly so as to bring about a meeting of the cutting edges of both, directly over the mouth of the trough. The arm 55 is loosely caried by a shaft 56 projecting parallel to the axes of the troughs and the shaft is journaled adjacent one end in a boss 57 integral with the supporting casting 30. The inner end of the shaft 56 projects beyond the face of the arm 55 and carries a hammer arm 58, which comprises a bar fixed at one end to the shaft 56, its free end being adapted to swing through a path directly across the face of blade 49, and which hammer drives against the upper surface of the piece of candy severed by the shearing movement of the blades 48 and 49. This movement of the hammer 58 prevents the separated piece of soft material from adhering to the blades while the latter are about to move to their open position. The blade 48 carries a stop member 59 disposed in the path of downward movement of the hammer 58 to limit such movement, as will be seen in Figure 7.

The shaft 56 carrying the hammer arm 58 projects to the side of the apparatus to a point substantially parallel with the edge of the casting 30, and carries an arm 60 which is directed towards the trough 46 and which is held by a constant tension spring 61, the latter being connected at opposite ends to the free end of the arm 60 and face of the bed plate 12. As a result, when the hammer is raised and then released the spring contracts and revolves the shaft to bring the hammer down very rapidly so as to strengthen the force of the blow against the material. A second arm 62 is disposed farther out on the shaft 56, and its free end, which projects rearwardly towards the troughs, is connected to the upper end of a link 63, the lower end thereof being provided with a fork 64 the arms of which straddle the shaft 10 closely adjacent the face of the cam 23. Mounted on the face of the fork 64 and riding over the cam surface of the cam 23 is a roller 65. The reciprocating movement of the roller 65 imparts a similar movement to the link 63, the cam being timed so as to bring the high point thereof from under the roller 65 just subsequent to a complete movement of the blades towards each other. As a result, the separated piece of material is driven downwardly and into the mouth of a chute which guides the material in its fall to the die molds.

The die molding arrangement C is disclosed in Figures 2, 3, 5 and 6, and consists primarily of a mold carrier which is preferably in the form of a circular turn-table 66 disposed laterally of the lower step 20. The table is carried by a vertical shaft 67, rotatably mounted in the bed plate 12, and projecting above and below the lower step 20, the lower end of the shaft being adapted to receive an intermittently rotated toothed plate 68. The mechanism for imparting a step by step rotary movement to the plate, and consequently the shaft 67 and turntable 66, is best shown in Figure 5, wherein 69 denotes a sector plate loosely journaled on the shaft 67 and movable through a plane closely adjacent the under face of the plate 68. One edge of the sector plate 69 projects substantially beyond the periphery of the toothed plate 68 to provide a support for a pin 70 on which the toothed plate actuating pawl 71 is mounted. The nose of the pawl 71 is held in engagement with the periphery of the plate 68 by a spring 72 connected at one end to the pawl and at the other to the under face of the sector plate 69. The nose of the pawl 71 is provided with an inclined back surface 73 which rides over the teeth of the plate 68 when the sector plate 69 is operated towards the right or counterclockwise, as shown in Figure 5. Disposed forward of the pawl 71 and projecting below the extended portion of the sector plate is a rotatably mounted pin 74 having a universal connection with one end of a laterally supported link rod 75, the opposite end being similarly connected to the strap 28 of the eccentric 24, the connection being arranged at the opposite side thereof from that of the connection for the link 53.

The opposite or rear edge of the sector plate 69 is provided with a laterally projecting lug 76 the outer face of which coincides with the periphery of the toothed plate 68, i. e. at the base of the teeth, the lug being adapted to operate a releasing mechanism comprising a spring pressed pawl 77 pivoted about a fixed pin 78 mounted in the under surface of the bed plate 12. The nose of the pawl 77 operates in the path of the teeth of the plate 68 at the opposite side thereof from the nose of the pawl 71, so that the pawl 77 is of a length which permits the pawl 71 to advance the plate 69 a distance equal to the distance between centers of the die molds in the turntable 66. A roller 79 is carried by the under face of the pawl 77 and is yieldably held so as to rest in the path of movement of the lug 76. As a result, when the plate 69 is moved counterclockwise and the nose of the pawl 71 has engaged the next tooth of the plate 68, the projection 76 engages the roller 79 and lifts the pawl 77 out of engagement with the preceding tooth of the plate 68; the plate 68 then being unobstructed in its farther clockwise movement, i. e. a movement equal in extent to the distance between centers of the die molds. The plate 68 is intended to be operated only in a clockwise direction, and to prevent undue reverse rotation, a spring actuated pawl 80 is pivoted on the pin 78 and projects in the same direction as the pawl 71, the pawl 80 being designed to ride over the teeth of plate 68 when the latter is advanced by the pawl 71, but preventing reverse movement of the plate for more than a relatively short distance before the nose of pawl 80 engages with the forward face of the teeth. The step by step advance movement of the parts just described, is effected by the eccentric 24 which is timed to impart a forward movement to the pawl 71 just subsequently to the operations of the blades towards each other and the drop of the hammer 58.

Referring now, to the die molding apparatus, the latter consists of the mold carrier or turntable 66 having a series of cells or mold cavities 81 herein shown as disposed in circular formation about a raised portion thereof. The plane of the upper face of the raised portion is substantially above the level of the upper step 21 of the bed plate 12. As will be seen in Figure 3, the cells 81 move in a circular path a portion of which is directly beneath the mouth of the trough 46. The material leaving the blades 48 and 49 is guided to the face of the table through a funnel shaped member 82, the upper mouth of which underlies the delivery end of the trough 46 while the lower discharge end stops at a point short of the face of the raised portion of the turntable 66. Each station in the movement of the table brings a cell 81 into axial alignment with the delivery end of the funnel 82.

The turn-table 66 includes a circular plate 83 which virtually forms the support for the raised portion previously referred to, and which is disposed on the same plane as step 21 of the bed plate 12, the wall of the step 21 being cut out at its right side to conform to the periphery of the plate 83, as illustrated in Figure 3. The die carrying member, designated 84, comprises a plate supported on the plate 83 and having the upright cell like openings 81 disposed about the periphery thereof. The portion or periphery of each opening adjacent the periphery of the member 84 is provided with a vertical radially disposed slot 85 which extends from the face of plate 84 to a point short of the face of the plate 83. An integral lip 86 projecting radially from the upright wall of the member 84 for each slot 85 is provided with a groove or channel 86' which forms a continuation of the slot 85. An under die plate 87 is mounted in each cell 81 and comprises a flat plate having a depending stem 88 movable in a suitable bearing opening extending through the plates 83 and 84 and through an integral boss 89 at the under face of the plate 83. The lower ends of the stems 88 are slightly beveled, see Figure 6, to contact with a fixed inclined cam surface 90 projecting upwardly from the lower step 20. The cam 90 is curved to conform to the path over which the stems travel, the zero end starting at one station beyond the rear center station and terminating at a distance at least three stations farther on in the movement of the stems.

The plunger mechanism D, the cycle of movement of which virtually controls the timing of the operations of the other mechanism involved in this apparatus, is disposed axially above the station at the extreme rear of the plate or turntable 66, i. e. one station beyond that which has been described as being aligned with the delivery end of the funnel 82. The plunger is supported in an upright position in a standard 91 mounted on the right side of the upper step 21, the standard having an overhanging portion provided with a square guideway to slidably receive the mid-portion of the stem 92 of the plunger proper. A die plate 93 is carried by the lower end of the stem 92 and is similar in size and shape to the under die plates 87. During the operation of the plunger, the die plate 93 moves into each cell 81, as the latter rests at the rear station, and compresses the candy therein and then completes its cycle by moving upwardly and out of the cell. Carried by the upper end of the plunger stem 92 is a yoke embracing an arm 94 projecting laterally from a hub 95 which is journaled in an arcuately movable bearing 96. The bearing 96 comprises a pair of upright arms 97 pivoted at their lower ends about a fixed shaft 98 supported in the standard 91. The hub 95 is further provided with a rearwardly projecting arm 99 which is connected to the upper end of a rod 100, the other end of the latter being connected to the strap of the eccentric 26. The eccentric 26 is timed to complete the downward movement of the plunger 92, i. e. the high point of the eccentric will be at the top, just subsequent to the high point of the eccentric 24 having been moved to the rear and the toothed plate 68 brought to rest.

The stick inserting mechanism E, may be of any suitable form and is herein shown as comprising an upright guide frame 101 provided with a hopper 102 at its upper end. The sticks 103 are placed transversely in the hopper 102 and are fed downwardly through the frame 101, as shown in Figure 1. The sticks are prevented from becoming jammed in the throat of the hopper 102 by means of an agitating device, designated 104, which receives its impulse from the rocking movement of the arm 99, as the outer end of the latter moves through a path in which a rocker arm 104' carried by the device 104 is disposed. The guide frame 101 is supported at its lower end on a plate 105 which is superposed on the face of the upper step 21 and which overlies a channel or groove 106 cut into the face of the step. The groove 106 is at the centre line of the front and rear stations of the turntable 66, as shown in Figure 3, and is on a plane which brings it into register with the grooves 86' of the die molds 81 as the latter move successively to the said rear station. The sticks from the hopper and the guide frame 101 fall one at a time into the groove 106, the mechanism for controlling this operation comprising a pair of parallel rods 107 yieldably movable transversely of the groove 106 and on a plane just above the latter. These rods 107 move together into and out of the path of the falling sticks so as to permit one stick to enter the groove 106, while the next stick is being supported upon the rods which have been moved thereunder. The rods 107 are carried by a cross-head 107' and are secured therein by set screws 107''. The cross-head 107' is moved toward the guide frame 101 by means of a spring 107$^a$ surrounding one of the rods 107 and interposed between said cross-head and a bracket 107$^b$ on the step 21 of the bed plate and in which bracket said last named rod 107 is guided. The cross-head 107' is moved away from the guide frame to withdraw the rods 107 therefrom by means of a cam bar 108 movable between a roller 108' carried by the cross-head 107' and a roller 105' mounted on the plate 105 and serving as a guide or abutment to receive the lateral thrust of said cam bar. The stick after falling into the groove 106 is advanced towards the turntable 66 by a plunger or ram 109 in the form of a straight rod on the plane of and movable through the groove 106. The rear end of the rod 109 is connected to a cross bar 110 which also is connected to the rear end of the cam bar 108. The cross bar 110 operates in a reciprocating movement towards and away from the rear wall of the bed plate 12, and is supported on a pair of parallel rods 111 projecting rearwardly from the said wall. Means to operate the cross bar 110 consist of a rocker arm 112 pivotally supported adjacent its center by a projecting integral lug 113 on the rear wall of the bed plate 12. The lower end of the arm 112 is connected to a link 114 which moves in a plane beneath the said wall and which is connected at its opposite end to the strap of the eccentric 25. The eccentric 25, as shown in Figure 4, is timed to operate its mechanism at substantially the same interval as that of the eccentric 26, so as to ram the stick into the cell 81 while the plunger is descending to compress the material into shape.

The final step in the operation of the apparatus is to eject the compressed candy, with its stick projecting therefrom, from the cell holding the same. This mechanism has been previously described in connection with the die molding apparatus so that it only remains to be explained that following the movement of the under die plate 87 to its maximum upward position, the shaped material will be brought to a level of the surface of the member 84 and the stick will be projecting outwardly over the edge of the said surface. The weight of the unsupported stick causes the disc portion to virtually stand on end and fall from the periphery of the turntable where it is received by the cooling apparatus, not shown.

As will be readily understood, a completed piece of candy is delivered from the apparatus for each step in the operation of the turntable and similarly for each step the sizing, feeding and cutting device B delivers a rough piece of material to a cell 81 in the turntable, the introduction of these taking place concurrently. The feeding and sizing rollers 37 and 38 are arranged so that while the turntable 66 is operating one step the rollers are drawing the roll of candy material through the troughs 45 and 46 and between the open blades 48 and 49. The blades then close and sever the material which drops into the underlying cell 81 in the table; the apparatus is then ready to advance another section of candy to be cut and deposited into a succeeding cell. The capacity of the entire apparatus is practically controlled by the time required for the completion of the cycle of the plunger, which operates for each move or step-ahead of the table, together with the possible increase in time which may occur in moving the table itself, the arrangement being such that while there may be a plurality of sections of candy within the apparatus at the same time, these mechanisms are so positioned as not to conflict and hence the successive operations of the devices will take place as long as there is a supply of material, the different devices being timed and related in their operation so as to take place during some part of this time period which is co-extensive with the complete cycle of the operation of plunger 92.

Having thus described my invention what I claim as new is:

1. In candy manufacturing machines, in combination, means for sizing and feeding the candy material, cutting means cooperating therewith for separating the advanced material into sections, a funnel to receive the said sections from the cutting means, the combination with a turntable having a series of circularly arranged die molds, the path of movement of said die molds being disposed across the end of said funnel, of a plunger for compressing the material within the die molds, means operating simultaneously therewith for inserting a stick into the section within the mold, and means for simultaneously and intermittently operating the feeding means, imparting a complete cycle of movement to the plunger and stick inserting mechanisms and for then operating first the cutting mechanism and thereafter the turntable during the time period which is substantially co-extensive with the complete cycle of operation of the said plunger, substantially as described.

2. In candy manufacturing machinery, the combination of means for intermittently feeding the candy material, shaping means including a series of circularly arranged die molds adapted to be intermittently rotated, the die molds being disposed in a turntable having a series of radial passages from the periphery of the table and communicating with the said molds, a plunger for compressing the material into shape within the molds, and means operated during the time period between the movement of the table for inserting one end of a stick through a radial passage and into the body of the material substantially simultaneously with the compression of the material by the downward operation of the plunger, substantially as described.

3. In candy manufacturing machinery, the combination of means for intermittently feeding the candy material, a turntable provided with a series of die molds movable through a path closely underlying the delivery side of the said rollers, the said table including a circular member having radially projecting groove members, the grooves of which are axially disposed with respect to a series of slots communicating with the interior of each mold, means for intermittently revolving said table in a step by step movement, the movement of the table being effected during the period in which the said rollers are moving, a plunger having a cycle of movement which permits it to enter successively the die molds as the latter move into position across the axis of the plunger, and a stick inserting mechanism operating substantially coincidently with the plunger and comprising a ram axially aligned with each of said grooves and slots in the turntable when the latter moves from one step to the next to bring a die mold across the path of the axis of the plunger, substantially as described.

4. In candy manufacturing machinery, the combination with means for sizing and intermittently feeding the candy material, of a series of intermittently rotating die molds, a plunger having a cycle of movement into and out of successive molds as they move step by step into the axis thereof, stick inserting mechanism operating coincidently with the movement of said plunger, and drive means including a series of eccentrically rotated members operatively connected to the said devices, whereby each device will be brought into operation during one cycle of movement of the plunger, substantially as described.

5. In candy forming machinery, the combination with a plunger, of cells to convey sections of candy into alignment with said plunger, a stick inserting mechanism for inserting a stick into the candy, and means for imparting simultaneous movement to the plunger and stick inserting device, whereby a piece of candy may be subjected to the action of the plunger while a stick is being inserted therein.

6. In a machine for making lollypops, a travelling mold carrier having in the face thereof a series of mold cavities, a plunger cooperating successively with the cavities in the mold carrier, stick-inserting means adapted to thrust a stick endwise into the candy in each mold cavity, and means for moving said mold carrier to bring the mold cavities successively into position opposite the plunger.

7. In a machine for making lollypops, sizing mechanism, cutting mechanism, a travelling mold carrier having therein a plurality of mold cavities, a plunger adapted to co-operate successively with said mold cavities, said cutting mechanism being located to deposit the candy in each mold cavity before it is brought into position to co-operate with said plunger, means for inserting sticks into the candy in said mold cavities successively, and means for operating said mold carrier, stick-inserting means, and plunger in timed relation.

8. In a lollypop machine, a travelling mold carrier having therein a plurality of mold cavities and stick-receiving grooves communicating with said cavities, a plunger adapted to co-operate with said cavities successively, means for moving said carrier to bring said cavities successively into position to co-operate with said plunger, a stationary member having a stick groove therein into alinement with which the grooves in said carrier are brought successively, means for feeding sticks one by one into said stationary groove, and a plunger adapted to move a stick endwise from the stationary groove into an alined groove in the carrier.

9. In a lollypop machine, the combination with a turntable and means to rotate the same step by step around a vertical axis, said turntable having a circular series of mold cavities in which unit masses are molded in succession, of means for delivering sticks to the several mold cavities in succession.

10. In a lollypop machine, the combination with a turntable and means to rotate the same step by step around a vertical axis, said turntable having a circular series of mold cavities in which unit masses are molded in succession, of means for delivering sticks to the several mold cavities in succession, said stick delivering means acting radially of the turntable.

11. In a lollypop machine, the combination with a turntable and means to rotate the same step by step around a vertical axis, said turntable having a circular series of mold cavities in which unit masses are molded in succession, of means for delivering sticks to the several mold cavities in succession, said turntable having a series of radially arranged channels communicating with said mold cavities along which the sticks are moved in succession into the several cavities.

12. A lollypop machine comprising in combination means to deliver units of material thereto, a turntable having a plurality of mold cavities for receiving the several units successively, means cooperating with the said turntable for forming the said units, means for delivering sticks into the said mold cavities successively, and means for moving the said turntable to bring the mold cavities thereof successively into unit receiving, forming, and stick receiving positions.

13. In a lollypop machine, a turntable having a plurality of mold cavities and stick-receiving grooves disposed radial of said turntable and communicating with said cavities respectively, a plunger adapted to cooperate with said cavities successively, and means for rotating said turntable to bring said cavities successively into position to cooperate with said plunger.

14. In a lollypop machine, a turntable having a plurality of mold cavities and stick-receiving grooves disposed radial of said turntable and communicating with said cavities respectively, a plunger adapted to cooperate with said cavities successively, means for rotating said turntable to bring said cavities successively into position to cooperate with said plunger, and mechanism for supplying sticks to said grooves successively and thrusting the same endwise into the candy in said cavities.

15. In a lollypop machine, a turntable having a plurality of mold cavities and stick-receiving grooves disposed radial of said turntable and communicating with said cavities respectively, a plunger adapted to cooperate with said cavities successively, means for rotating said turntable to bring said cavities successively into position to cooperate with said plunger, a stationary member having a stick groove therein into alinement with which the grooves in the turntable are brought successively, means for feeding sticks one by one into said stationary groove, and a plunger adapted to move a stick endwise from the stationary groove into an alined groove in the turntable.

In testimony whereof I affix my signature.

RAY W. KROUT.